United States Patent [19]

Jennings

[11] Patent Number: 5,207,400

[45] Date of Patent: May 4, 1993

[54] FLAP ASSEMBLY

[75] Inventor: Robert L. Jennings, Belfast, Northern Ireland

[73] Assignee: Short Brothers PLC, Belfast, Northern Ireland

[21] Appl. No.: 663,871

[22] PCT Filed: Jul. 4, 1990

[86] PCT No.: PCT/GB90/01031

§ 371 Date: May 6, 1991

§ 102(e) Date: May 6, 1991

[87] PCT Pub. No.: WO91/00824

PCT Pub. Date: Jan. 24, 1991

[30] Foreign Application Priority Data

Jul. 6, 1989 [GB] United Kingdom ............. 8915487

[51] Int. Cl.$^5$ ............................................. B64C 9/16
[52] U.S. Cl. ................................................. 244/216
[58] Field of Search ..................... 244/213, 215, 216

[56] References Cited

U.S. PATENT DOCUMENTS 2,137,879 11/1938 Ksoll ............................ 244/216
3,985,319 10/1976 Dean et al. .................... 244/216

Primary Examiner—Galen Barefoot

[57] ABSTRACT

A flap assembly includes a flap member (2) located at the trailing edge of an aircraft wing (4). A bracket (12) extends down from the flap member (2), and a mounting arm (8) extends rearwardly from the lower surface of the wing. Two link arms (14 and 16) are pivotally mounted at their upper ends (18 and 20) to the mounting arm (8), and at their lower ends (22 and 24) to the bracket (12). The flap member (2) is moved between its stowed and its downwardly extended positions by an actuating mechanism (26) which is mounted on the aircraft wing (4), and connected either to the flap member (2) or to the bracket (12). The actuating mechanism (26) may be of either a linear or a rotary type.

14 Claims, 8 Drawing Sheets

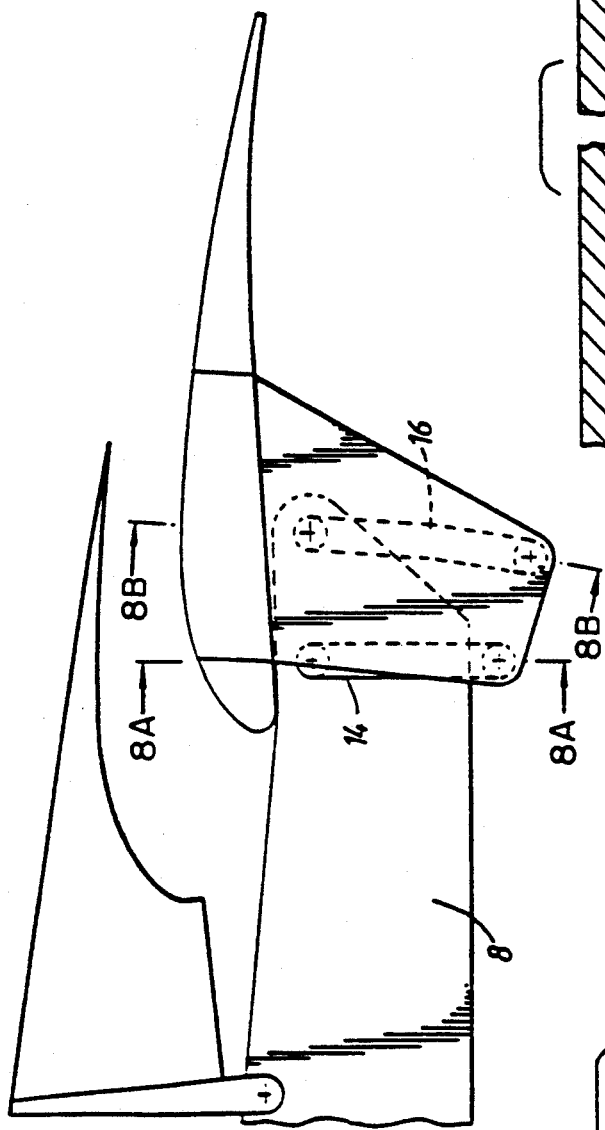
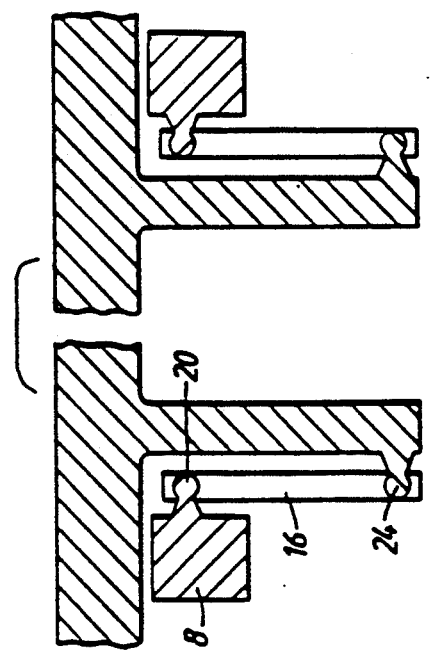
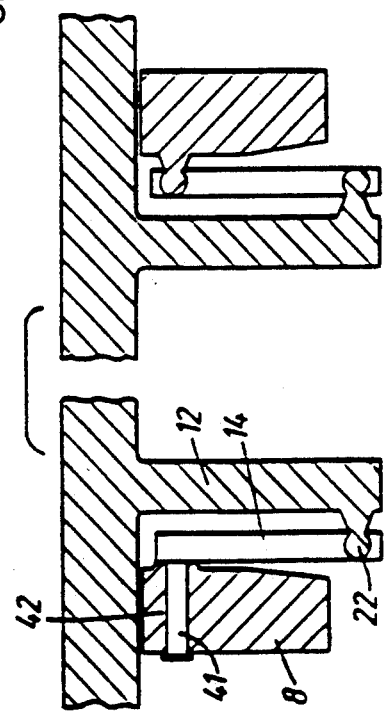
Fig. 8
Fig. 8A
Fig. 8B

FLAP ASSEMBLY

The present invention relates to a flap assembly for an aerofoil, such as, for example, an aircraft wing.

The invention is particularly concerned with a flap assembly suitable for an aircraft having a variety of mission requirements, such as for example, a short take-off and landing.

It is conventional for commercial aircraft to be provided with single, double or triple slotted flaps that travel along curved tracks. Although this arrangement can provide near optimum flap positions for take-off and landing with small fairings posessing low-drag, the flap track supports are heavy and possess significant inherent in-service problems which arise mainly from the line contact of the heavily loaded rollers forming part of the flap assembly.

It is desirable to be able to provide a flap system having the aerodynamic characteristics of the track-guided flaps, particularly for aircraft which operate with a mix of mission requirements, such as short and long range, intermediate gross weight and short landing field lengths. It will be appreciated therefore, that a need arises for a flap system which possesses the desirable features of the track-guided flaps while avoiding some of their disadvantages.

It has been found that the type of flap arrangement suitable for an aircraft is determined by the following three basic mission requirements of the aircraft:

1. The length of landing field and maximum touch-down speed for the aircraft. These define the criteria of flap size for short to medium range aircraft having a high wing loading for operation from short runways, and include aircraft having a short take-off and landing run. It will be understood that for landing, the flap is fully extended thereby giving a maximum lift coefficient.

2. The maximum length of the take-off field or runway. This influences the flap arrangement particularly where there is a high thrust to weight ratio aircraft together with a requirement for a very short take-off field or runway.

3. The one-engine-out second segment climb gradient. To ensure safety, the certification authorities require a demonstration of aircraft climb capability with one engine inoperative. By "second segment" is meant that portion of the take-off process between thirty-five and four hundred feet above the take-off surface in which a specified minimum climb gradient shall be obtained. This requirement generally determines the flap configuration for twin and three engine aircraft having a high wing loading. In order to achieve the minimum climb gradient with one engine inoperative, the lift to drag ratio of the aircraft must be optimised. High lift to drag ratios may be achieved with high Fowler motion at low flap angles. Because the flap setting for take-off and second segment climb is usually the same, the take-off setting is influenced by both the take-off field or runway length and the second segment climb gradient.

Providing that the intermediate flap positions are not critical, the criteria for selecting the mechanism are; simplicity; high reliability and low cost, low load i.e. low weight; and compactness with a consequent low drag. However, in cases where there are stringent requirements for take-off field length, and one engine out second segment climb gradient, the intermediate flap positions are critical. In consequence, aircraft which have to fulfil these requirements, must have a flap system that provides very high Fowler motion at low flap angles, and in which most of the flap rotation occurs toward the end of the flap deployment to its downwardly extended position.

Consideration has therefore been given to providing a simple non-tracked flap mechanism which provides an adequate Fowler motion and requires a small flap support fairing having a low cruise drag.

A previously proposed flap track and roller mechanism has a so called cylindrical geometry, in which the amount of flap extension is uniform. This means that the linkage geometry has the same size for each span wise spaced flap extension mechanism. However, this cylindrical flap movement does not provide the desired span wise and chordwise aerodynamic loading of aerofoils which are tapered in plan.

It is an aim of the invention to provide a flap assembly which alleviates at least some of the above-mentioned difficulties of the previously proposed mechanisms.

According to the present invention there is provided a flap assembly for an aerofoil, said assembly comprising a support structure secured to the aerofoil and extending rearwardly from the lower surface of the aerofoil, a flap member, a bracket extending from said flap member, a linkage mechanism connecting the bracket to the support structure so as to mount the flap member on the support structure for movement between an upper forward stowed position and a lower rearwardly, downwardly extended position, the linkage mechanism being dimensioned and arranged so that the majority of the flap rotation takes place over the rearward part of the flap member travel, and means for actuating said linkage to move said flap member between said stowed and downwardly extended positions.

In an embodiment of the invention the flap member may be constrained to move from its stowed position initially in a downward and rearward direction with a relatively minor change of flap angle, and to move subsequently with an increasing flap rotation to its fully extended position.

The actuating means may be mounted between the aerofoil and the flap member, or alternatively between the aerofoil and the bracket. This actuating means may have either a linear action or a rotary action.

In a preferred embodiment of the invention, the linkage mechanism may comprise two link members which are pivotally mounted at their upper ends to the support structure, and at their lower ends to the bracket. One of said link members may have rotational freedom at its upper mounting only about its pivotal axis, and the lower mounting of this link and both mountings of the other link members may have complete rotational freedom.

Preferably the flap mechanism may comprise a plurality of transversely spaced support structures and linkage mechanisms, and one or more actuating means which are dimensioned and arranged to affect said movement of the flap member. In the situation where the aerofoil is tapered in plan form, the linkage mechanisms may be arranged to provide a flap movement which is proportional to the wing chord length at the region of each linkage means.

Embodiments of the invention will now be described by way of example with reference to the accompanying illustrative diagrammatic drawings in which:

FIGS. 8, 8A and 8B illustrate a mechanism to allow slewing motion of the flap member.

For clarity, corresponding components in the various flap assemblies of the invention have been given the same reference numerals.

Figure 1:
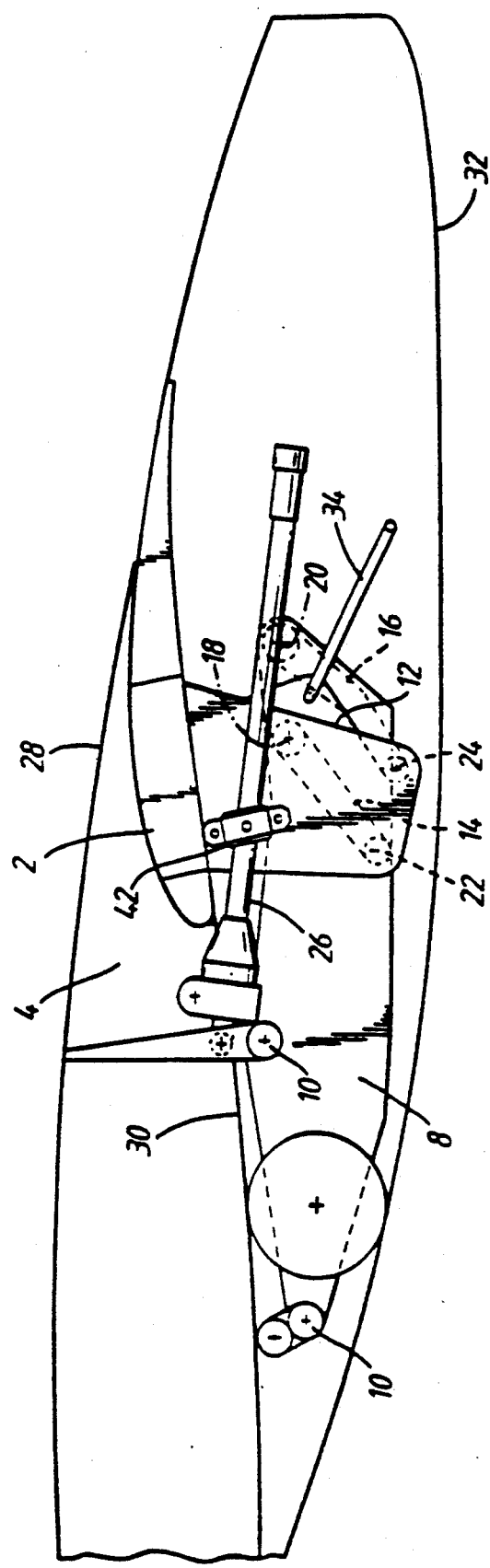
FIG. 1 is a first flap assembly in its stowed position.
Figure 2:
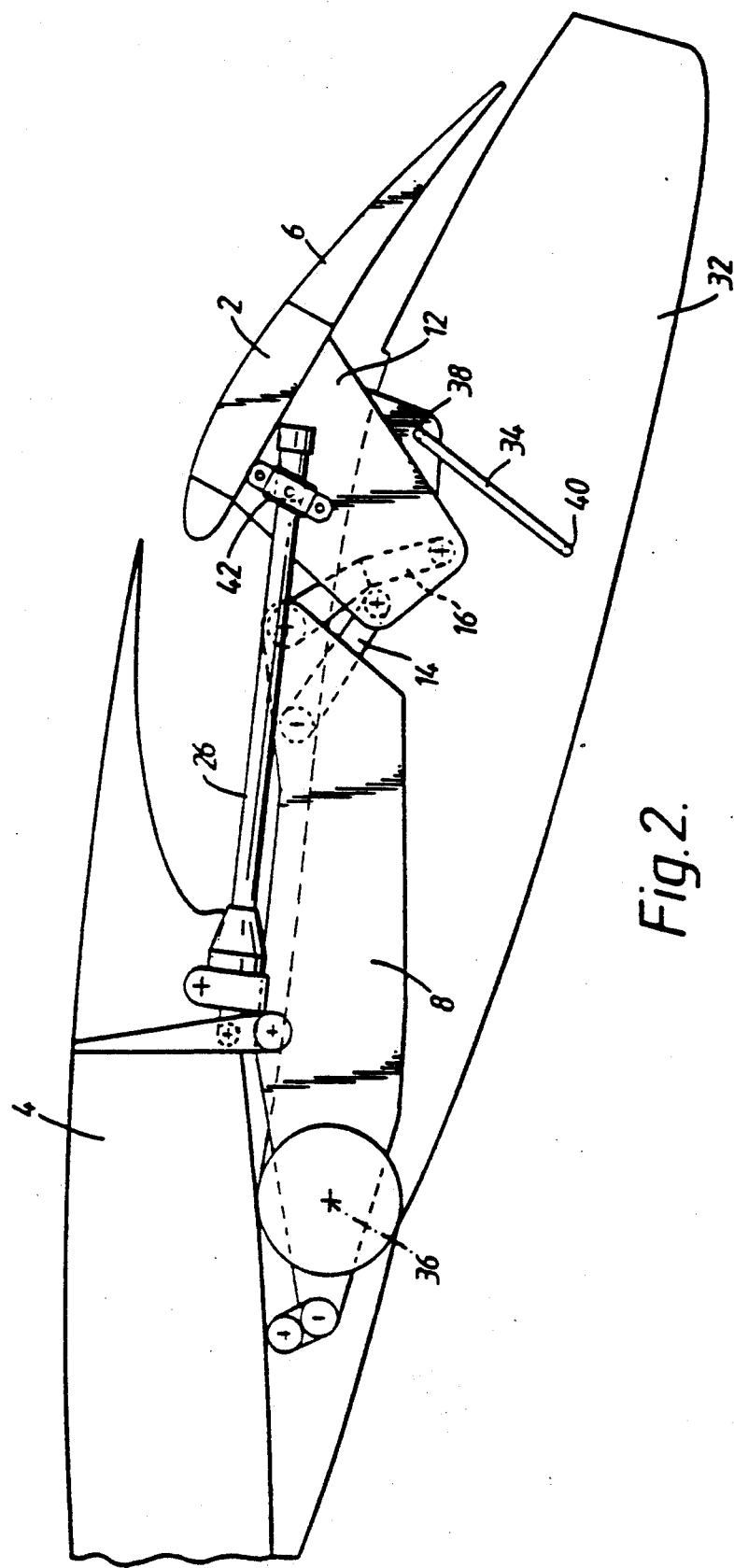
FIG. 2 is the first flap assembly in its downwardly extended position.

Referring to FIGS. 1 and 2, a flap assembly includes a flap member 2 located at the trailing edge of an aircraft wing 4 for movement between a stowed position illustrated in FIG. 1, and a downwardly extended position 6 illustrated in FIG. 2.

An elongate mounting arm 8 is secured to the lower surface of the wing 4 by bolts 10 and extends rearwardly from the lower surface of the wing. A fin-shaped bracket 12 extends downwardly from the flap member 2 adjacent to part of the mounting arm 8.

A linkage mechanism comprises two link arms 14 and 16 which are each pivotally mounted at their upper ends 18 and 20 to longitudinal spaced regions on the rear portion of the mounting arm 8. The link arms 14 and 16 are pivotally mounted at their lower ends 22 and 24 to longitudinally spaced parts of the lower part of the bracket 12.

An actuating mechanism 26 for moving the flap member 2 between its stowed and extended positions is mounted on a fixed part of the aircraft wing 4, and is connected to a front bracket 42 mounted on the flap. The actuating mechanism 26 is of the linear type.

When the flap member 2 is in its stowed position for cruise conditions of the aircraft, it will be seen from FIG. 1 that the flap member nests within a cavity at the rear edge of the wing 4 which is defined by an upper shroud panel 28 and a lower panel 30. This upper shroud panel may either be fixed in position, or alternatively it may be moveable upwardly from its illustrated position to act as a spoiler in order to prevent or reduce lift of the aircraft.

To move the flap member 2 from its stowed position illustrated in FIG. 1 to its extended position illustrated in FIG. 2, the actuating mechanism 26 is operated to move the bracket 12 rearwardly from its stowed position to its downwardly extended position. This rearward movement of the bracket 12 produced by the actuating mechanism 26 causes link arms 14 and 16 to rotate counter clockwise as illustrated in FIGS. 1 and 2. The spacing and dimensions of these link arms 14 and 16 are such that firstly, in moving the flap member 2 from its stowed to its extended position, the bracket 12 and hence the flap member 2, are initially moved downwardly and rearwardly substantially parallel to the wing 4, to enable the flap member 2 to withdraw from the shroud panel 28, and secondly, most of the rotation of the flap member 2 takes place after the aforementioned initial rearward movement of the flap member 2.

Figure 3:
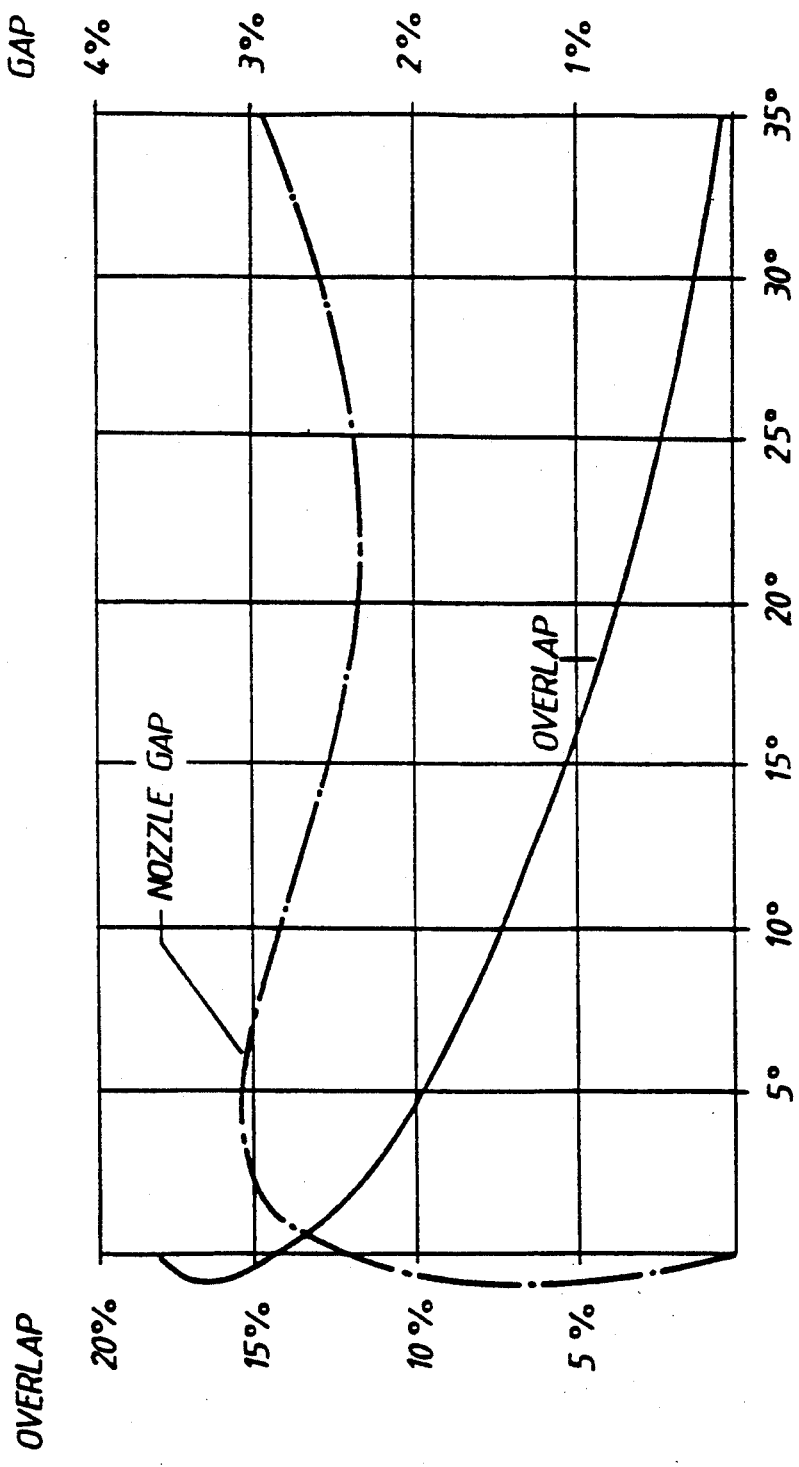
FIG. 3 is a graph of several parameters of the flap assembly.

It is a feature of the invention that the flap member support mechanism is dimensioned so that as the flap member 2 is moved between its stowed and extended positions, and air channel is formed between the upper contours of the flap member 2 and the underside of the lower shroud panel 30. This air channel has a cross-sectional area which reduces in the direction of the main airflow, and terminates in a nozzle or slot at the shroud trailing edge which assists in preventing separation of the main air flow from the upper surface of the flap member 2. The size of this slot gap is important for the efficient aerodynamic functioning of the flap member 2 and the linkage geometry is proportioned and disposed to provide a predetermined gap over the major portion of travel of the flap member 2 as indicated in FIG. 3.

The mounting arm 8, the bracket 12 and the link arms 14 and 16 may be housed within a fairing 32. In the embodiment of FIGS. 1 and 2, the main part of the fairing 32 is rotated clockwise about a point 36 by the action of a link 34 which is pivotally mounted at its upper end 38 to the bracket 12, and pivotally mounted at its lower end 40 to the fairing 32.

Figure 4:
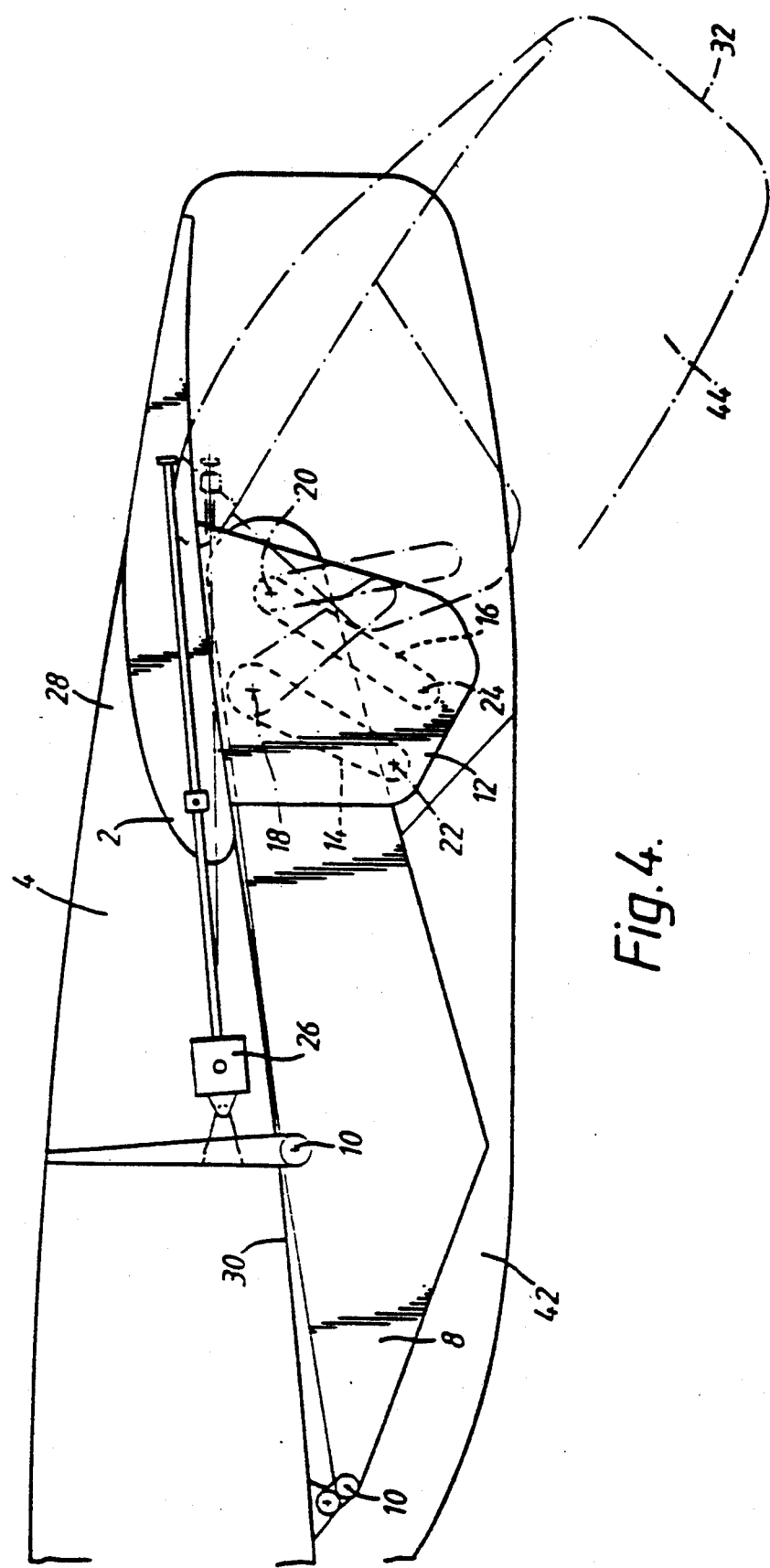
FIG. 4 is a second flap assembly.

Referring to FIG. 4, a second flap assembly includes a two-piece fairing having a fixed forward portion 42, and a movable portion 44 which is separable from the front portion 42, and moves bodily with the flap member 2 during its movement from the stowed to the extended positions.

Figure 5:
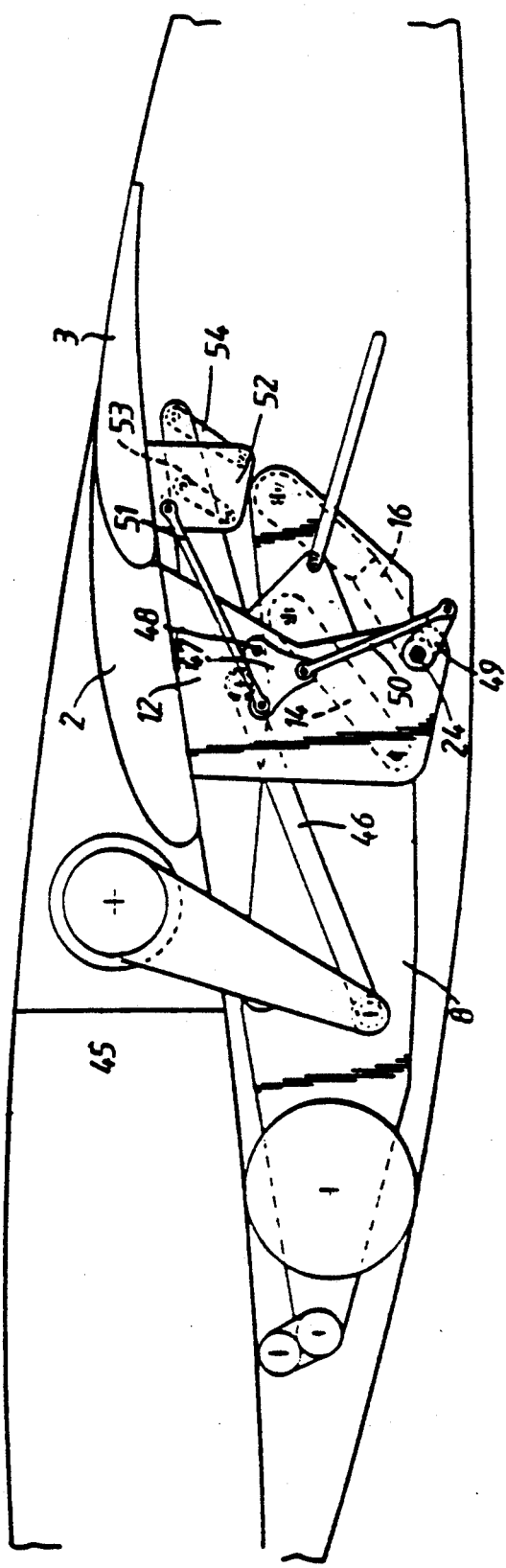
FIGS. 5, 6 and 7 illustrate further flap assemblies of the invention.
Figure 6:
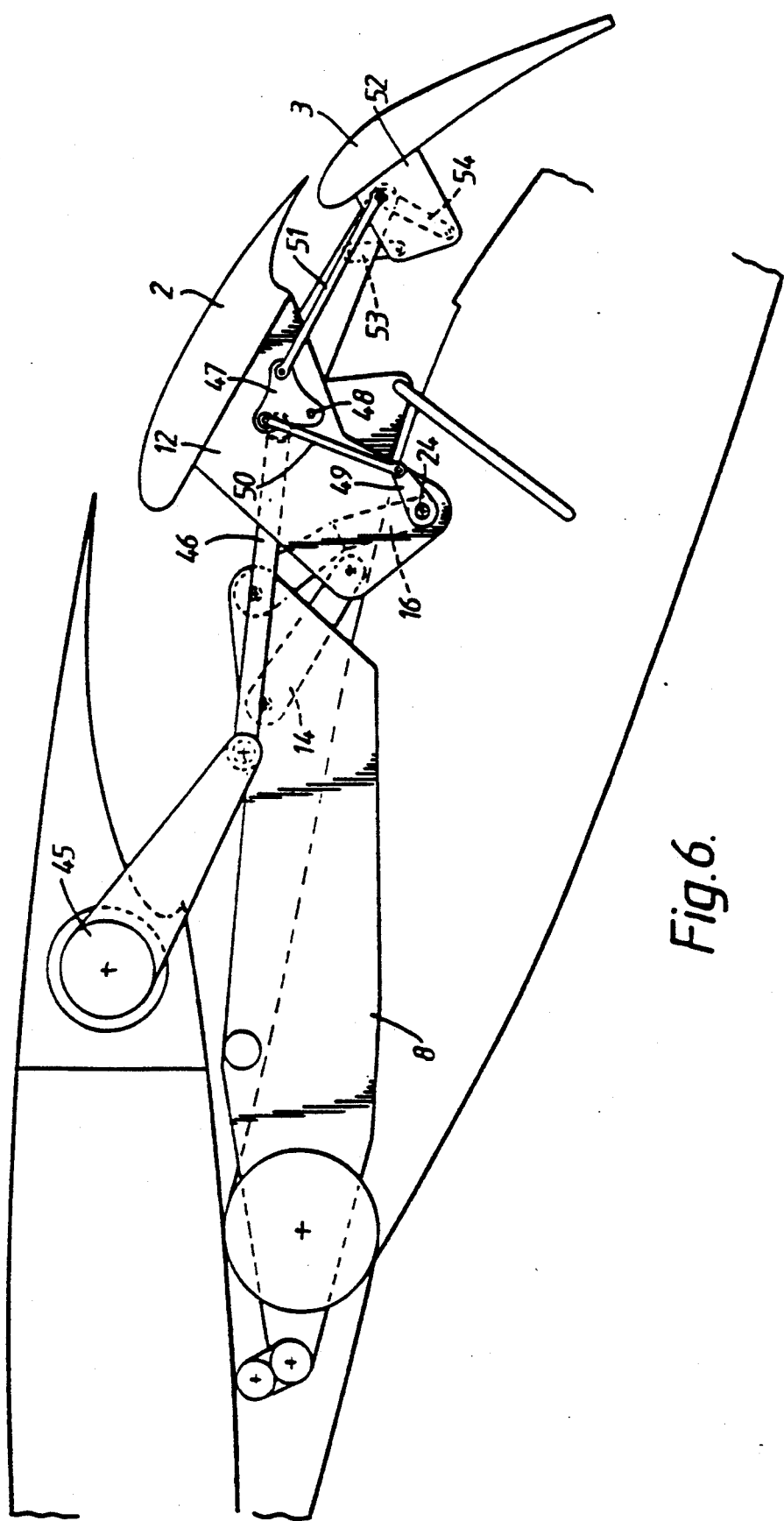
Figure 7:
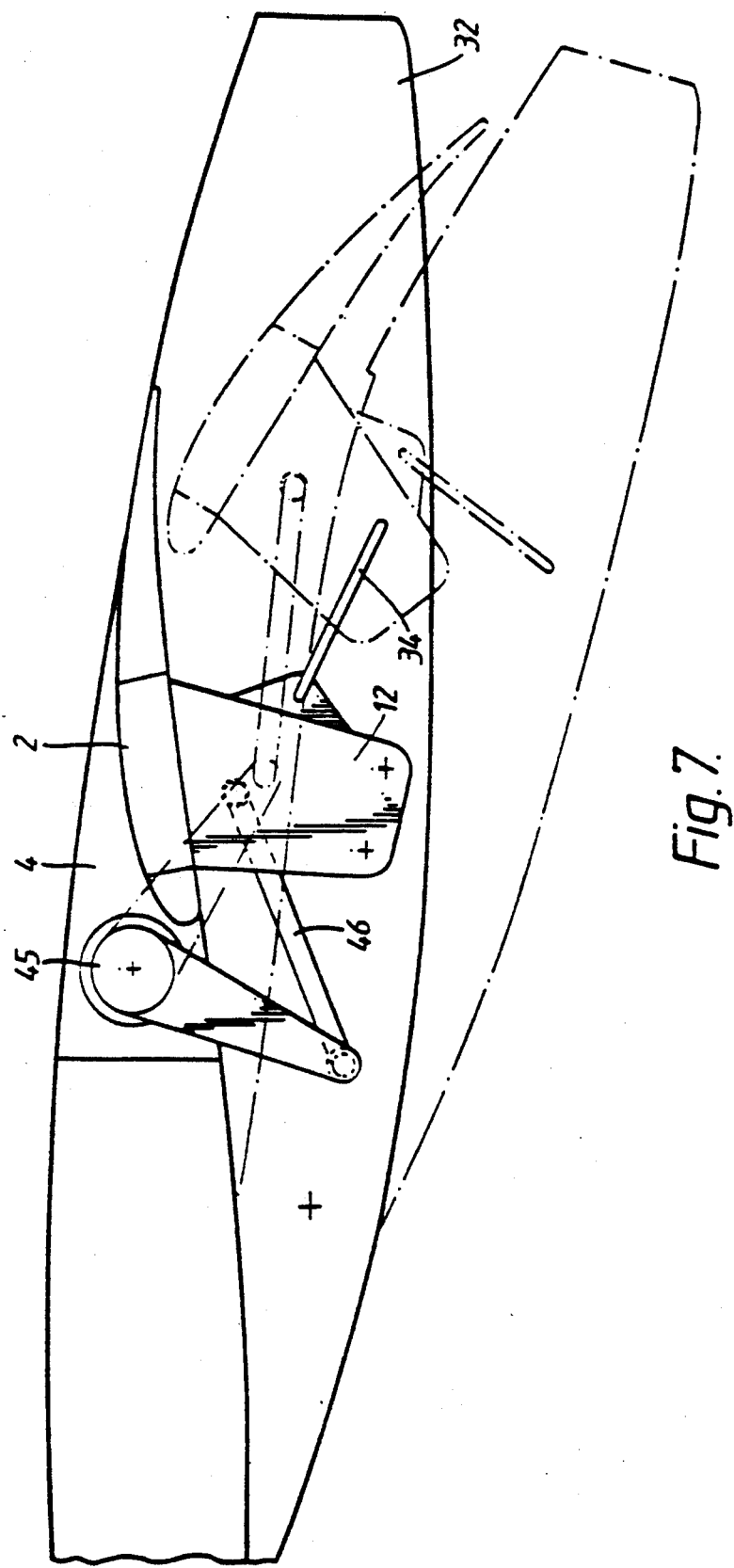

FIGS. 5, 6 and 7 illustrate flap mechanisms in which the flap member 2 is moved by an actuating mechanism comprising a rotary actuator 45 and a link 46 pivotally connected at one end to the actuator 45 and at the other end to the bracket 12. It will be understood from these Figures, that the flap member 2 is moved between its stowed and downwardly extended positions by counter clockwise movement of the rotary actuator 45. The link arms 14 and 16 in these mechanisms operate in the same way as the link arms 14 and 16 of the mechanism illustrated in FIGS. 1 and 2.

FIGS. 5 and 6 illustrate a flap assembly having forward and rearward flap members 2 and 3 in their stowed and downwardly extended positions respectively.

A bracket 52 extends downwardly from the rear flap member 3, and this bracket 52 is connected to a rearward extension of the bracket 12 by a linkage mechanism composed of link arms 53 and 54 which operate in the same manner as the link arms 14 and 16. A further actuating mechanism is also provided for moving the flap member 3 between a stowed position within the first flap member 2 and a downwardly extended position spaced from the first flap member 2. This actuating mechanism member includes a bell crank 47 which is pivotally mounted at 48 to the bracket 12, and an arm 49 which is attached to the link arm 16. A connecting link 50 is pivotally connected at one end to the bell crank 47, and at the other end to the arm 49 while a second connecting link 51 is connected at one end to the bell crank 47 and at the other end to the bracket 52.

During the movement of the flap members 2 and 3 from the stowed position, the arm 49, which is attached to the link arm 16, rotates counter clockwise about the pivot point 24 relative to the bracket 12. This rotation causes the connecting link 50 to impart a clockwise rotation to the bell crank 47 about the pivot point 48, thereby operating the connecting link 51 causing the bracket 52, and hence the rear flap member 3 to move rearwardly and to rotate relative to the bracket 12 and the forward flap member 2 into the downwardly extended position illustrated in FIG. 6.

FIG. 7 illustrates a flap mechanism including a single flap member 2 having a bracket 12, and a fairing 32. For clarity, the mounting arm 8 and the link arms 14 and 16 have been omitted. The mounting of the flap member 2, and the method by which the fairing 32 is moved to its downward position illustrated in dotted lines are as previously described in this specification.

For clarity, the above-mentioned flap assemblies have been described with reference to a single mounting arm 8, actuating mechanism 26 and linkage mechanism 14 and 16. Two or more transversely spaced arms and mechanisms, each of which is substantially aligned to the airflow, may be mounted from the wing structure to support a flap member 2. Where the wing has a constant chord in plan form, a cylindrical flap movement is acceptable, and the corresponding links 14 and 16 of the mechanisms at each support position can be of the same length. Because, however, most aircraft have wings which are tapered in plan form, it is necessary in the interests of aerodynamic efficiency to arrange the flaps to move along a generally conical contour, so that the flap movement at any location is substantially proportional to the wing chord at that location.

In consequence, the elements of the flap mechanisms at the transversely spaced locations are dimensioned and arranged to provide the required translational and rotational movement of the substantially rigid flap member.

Although the above-described linkage moves substantially in a plane perpendicular to the wing to provide the required flap motion, provision is made to accommodate any required slewing motion of the flap relative to the wing during the flap travel. One construction for accommodating this slewing motion will now be described with reference to FIG. 8.

Referring to FIG. 8, one link arm 14 is attached at its upper end to a shaft 41 mounted in a bearing 42 within the mounting arm 8. This bearing 42 is arranged to provide rotational freedom and axial constraint to the shaft 41. The lower end of the link 14 is pivotally mounted to the bracket 12 by a sperical bearing 22 which has tolerational freedom in all planes. The other link arm 16 has spherical bearings 20 and 24 at both upper and lower ends, each of which has rotational freedom in all planes about its centre. In consequence, the bearings of the link arms 14 and 16 accommodate any required slewing motion of the flap member 2 during its travel relative to the aircraft wing.

I claim:

1. A flap assembly for an aerofoil, said assembly comprising
   a support structure secured to the aerofoil and extending rearwardly from the lower surface of the aerofoil,
   a first flap member,
   a first bracket extending from said flap member,
   a first linkage mechanism connecting said bracket to said support structure to mount said flap member on said support structure for movement between an upper forward stowed position and a lower rearwardly, downwardly extended position, said linkage mechanism being dimensioned and arranged so that the majority of the rotation of said flap member takes place over the rearward part of the flap member travel,
   means for actuating said first linkage mechanism to move said flap member between said stowed and downwardly extended positions,
   wherein said first linkage mechanism comprises two link members pivotally mounted at their upper ends to the support structure and at their lower ends to said first bracket, one of said members at its upper mounting having rotational freedom about only its pivotal axis, and the lower mounting of this link member, and both mountings of the other link member, having complete rotational freedom.
   a second flap member,
   a second bracket extending from said second flap member,
   a second linkage mechanism connecting said second bracket to the said first bracket to mount said second flap member on said first bracket for movement between an upper forward stowed position and a lower rearwardly, downwardly extended position, and
   means for actuating said second linkage mechanism to move said second flap member between said stowed and downwardly extended positions.

2. The flap assembly as claimed in claim 1 wherein an air channel is formed between said first flap member and a portion of the aerofoil during movement of said first flap member from the stowed position, said first linkage mechanism providing a predetermined air channel dimension over a major portion of the flap member travel.

3. The flap assembly as claimed in claim 1 wherein each of said first and said second brackets is joined to its respective flap member and has a length greater than the depth of its respective flap member.

4. The flap assembly as claimed in claim 1 wherein said first linkage mechanism includes two link members, each of said link members having first and second end portions, said first end portions being pivotally mounted to said support structure at longitudinally spaced locations thereon.

5. The flap assembly as claimed in claim 4 wherein said second end portions are pivotally mounted to said first bracket at longitudinally spaced locations thereon.

6. The flap assembly as claimed in claim 5 wherein said second linkage mechanism includes two link members, each of said link members having first and second end portions and wherein said first bracket includes an extended portion, said first end portions of said second linkage mechanism being pivotally mounted to said extended portion at longitudinally spaced locations thereon.

7. The flap assembly as claimed in claim 1, wherein each linkage mechanism is arranged to provide flap movement proportional to the wing chord length at the region of each linkage mechanism.

8. In combination,
   an aircraft wing;
   a mounting arm secured to and extending from a lower surface of said wing;
   a flap assembly including a flap member and a fin shaped bracket depending from said flap member;
   a linkage mechanism connecting said bracket to said mounting arm, said linkage including a pair of link arms, each arm being pivotally connected at an upper end to said mounting arm and at a lower end to said bracket, said upper end of one of said link arms having rotational freedom only about its pivotal axis, and the lower end of this link arm, and both ends of the other of said link arms having complete rotational freedom; and
   an actuating mechanism for moving said flap member between a stowed position within said wing and a downwardly extended position spaced from said wing, said actuator mechanism being connected to and between said wing and said bracket to effect pivoting of said link arms on said mounting arm and movement of said flap from said wing first with a downward and rearward movement to clear said wing and then with a rotation movement.

9. A flap assembly as claimed in claim 8 wherein the linkage mechanism is arranged to provide flap movement proportional to the wing chord length at the region of the linkage mechanism.

10. The combination as set forth in claim 8 further comprising a fairing pivotally connected to said mounting arm and a link pivotally connected to and between said bracket and said fairing to pivot said fairing with said flap member.

11. The combination as set forth in claim 8 wherein said actuating mechanism includes a rotary actuator mounted on said wing and a link pivotally connected to and between said actuator and said bracket.

12. The combination as set forth in claim 8 which comprises a second flap assembly having a second flap member and a second fin shaped bracket depending from second flap member;

a second linkage mechanism connecting said second bracket to said mounting arm said second linkage mechanism including a pair of link arms pivotally connected to and between said second bracket and said mounting arm; and a second actuating mechanism for moving said second flap member between a stowed position within the first flap member and a downwardly extended position spaced from said first flap member.

13. The combination as set forth in claim 12 wherein said second actuating mechanism includes a bell crank pivotally mounted on the first bracket, an arm secured to link arm of the first linkage mechanism, a connecting link pivotally connected to and between said arm and said bell crank, and a connecting link pivotally connected to and between said bell crank and said second bracket.

14. The flap assembly as claimed in claim 8 wherein an air channel is formed between said first flap member and a portion of the aerofoil during movement of said first flap member from the stowed position, said first linkage mechanism providing a predetermined air channel dimension over a major portion of the flap member travel.

* * * * *